(12) United States Patent
Brentano et al.

(10) Patent No.: US 8,499,009 B2
(45) Date of Patent: *Jul. 30, 2013

(54) METHOD AND SYSTEM FOR MANAGING DIGITAL GOODS

(75) Inventors: James Brentano, Orinda, CA (US); Toby Pieber, Orinda, CA (US); Paul Martinelli, Berkeley, CA (US); Brad Thompson, Danville, CA (US); Richard Northing, Alamo, CA (US)

(73) Assignee: Flexera Software LLC, Schaumburg, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/372,272

(22) Filed: Feb. 13, 2012

(65) Prior Publication Data
US 2012/0144381 A1    Jun. 7, 2012

Related U.S. Application Data

(63) Continuation of application No. 11/608,201, filed on Dec. 7, 2006, now Pat. No. 8,135,756, which is a continuation of application No. 10/835,688, filed on Apr. 29, 2004, now Pat. No. 7,958,163, which is a continuation-in-part of application No. 10/635,840, filed on Aug. 5, 2003, now abandoned.

(51) Int. Cl.
*G06Q 30/06* (2012.01)

(52) U.S. Cl.
USPC .......................... 707/805; 707/791; 707/795

(58) Field of Classification Search
CPC ............ G06F 17/30; G06F 17/00; G06Q 30/06
See application file for complete search history.

(56) References Cited

U.S. PATENT DOCUMENTS

| 5,208,765 | A |   | 5/1993 | Turnbull |           |
|-----------|---|---|--------|----------|-----------|
| 5,627,973 | A | * | 5/1997 | Armstrong et al. | 705/7.32 |

(Continued)

FOREIGN PATENT DOCUMENTS

| EP | 0467584 | 1/1992 |
| EP | 1091304 | 4/2001 |

(Continued)

OTHER PUBLICATIONS

"Asera Launches Web-Based Customer Support Solution with Integrated Intraware SubscriberNet Download Portal", Business Editors, Business Wire, Feb. 27, 2002.

(Continued)

*Primary Examiner* — Farhan Syed
(74) *Attorney, Agent, or Firm* — Michael A. Glenn; Glenn Patent Group

(57) ABSTRACT

A system and method for transferring digital goods facilitates bulk upload of file images to a central repository. The software gets a File ID and a path to each file image to be uploaded from a list, typically an XML file, of input attributes. After successful verification, the file image is uploaded to the central repository and linked with a corresponding metadata object. Each metadata object contains attributes that describe the corresponding file image. Although file attributes may be defined when the metadata object is created, the software determines file image attributes as the file image is being uploaded and records them in the metadata object. File images are either uploaded from a server, typically an FTP server, having been placed there by the goods vendor; or the file images can be uploaded directly from a computer operated by the vendor.

3 Claims, 4 Drawing Sheets

U.S. PATENT DOCUMENTS

| | | | |
|---|---|---|---|
| 5,758,327 A * | 5/1998 | Gardner et al. | 705/26.82 |
| 5,808,894 A * | 9/1998 | Wiens et al. | 700/231 |
| 5,825,883 A * | 10/1998 | Archibald et al. | 705/53 |
| 5,867,799 A | 2/1999 | Lang et al. | |
| 5,895,450 A * | 4/1999 | Sloo | 705/309 |
| 5,903,721 A | 5/1999 | Sixtus | |
| 5,931,917 A | 8/1999 | Nguyen et al. | |
| 5,950,173 A | 9/1999 | Perkowski | |
| 5,970,490 A | 10/1999 | Morgenstern | |
| 6,006,191 A | 12/1999 | DiRienzo | |
| 6,021,202 A | 2/2000 | Anderson et al. | |
| 6,032,159 A | 2/2000 | Rivlin | |
| 6,081,518 A | 6/2000 | Bowman-Amuah | |
| 6,092,057 A * | 7/2000 | Zimmerman et al. | 705/44 |
| 6,122,403 A | 9/2000 | Rhoads | |
| 6,163,772 A | 12/2000 | Kramer et al. | |
| 6,167,382 A | 12/2000 | Sparks et al. | |
| 6,167,406 A | 12/2000 | Hoskins et al. | |
| 6,178,409 B1 | 1/2001 | Weber et al. | |
| 6,199,079 B1 * | 3/2001 | Gupta et al. | 715/207 |
| 6,226,618 B1 | 5/2001 | Downs et al. | |
| 6,253,027 B1 | 6/2001 | Weber et al. | |
| 6,269,080 B1 | 7/2001 | Kumar | |
| 6,289,382 B1 | 9/2001 | Bowman-Amuah | |
| 6,304,915 B1 | 10/2001 | Nguyen et al. | |
| 6,332,135 B1 | 12/2001 | Conklin et al. | |
| 6,345,256 B1 | 2/2002 | Milsted et al. | |
| 6,345,288 B1 | 2/2002 | Reed et al. | |
| 6,374,402 B1 | 4/2002 | Schmeidler et al. | |
| 6,389,403 B1 | 5/2002 | Dorak et al. | |
| 6,418,421 B1 | 7/2002 | Hurtado et al. | |
| 6,418,441 B1 | 7/2002 | Call | |
| 6,438,594 B1 | 8/2002 | Bowman-Amuah | |
| 6,442,547 B1 | 8/2002 | Bowman-Amuah | |
| 6,442,748 B1 | 8/2002 | Bowman-Amuah | |
| 6,449,588 B1 | 9/2002 | Bowman-Amuah | |
| 6,457,017 B2 | 9/2002 | Watkins et al. | |
| 6,477,665 B1 | 11/2002 | Bowman-Amuah | |
| 6,484,149 B1 | 11/2002 | Jammes et al. | |
| 6,493,678 B1 | 12/2002 | Foster et al. | |
| 6,519,571 B1 | 2/2003 | Guheen et al. | |
| 6,523,027 B1 | 2/2003 | Underwood | |
| 6,529,948 B1 | 3/2003 | Bowman-Amuah | |
| 6,536,037 B1 | 3/2003 | Guheen et al. | |
| 6,539,396 B1 | 3/2003 | Bowman-Amuah | |
| 6,587,837 B1 | 7/2003 | Spagna et al. | |
| 6,615,217 B2 | 9/2003 | Rosensteel, Jr. | |
| 6,629,135 B1 | 9/2003 | Ross, Jr. | |
| 6,678,695 B1 | 1/2004 | Bonneau et al. | |
| 6,834,282 B1 | 12/2004 | Bonneau et al. | |
| 6,934,693 B2 | 8/2005 | Stefik et al. | |
| 6,950,867 B1 * | 9/2005 | Strohwig et al. | 709/224 |
| 7,080,070 B1 | 7/2006 | Gavarini | |
| 7,110,965 B1 | 9/2006 | Pierce | |
| 7,110,984 B1 | 9/2006 | Spagna et al. | |
| 7,120,800 B2 | 10/2006 | Ginter et al. | |
| 7,136,840 B2 * | 11/2006 | Pinkas et al. | 705/75 |
| 7,181,017 B1 | 2/2007 | Nagel et al. | |
| 7,287,002 B1 * | 10/2007 | Asher et al. | 705/26.8 |
| 7,316,032 B2 | 1/2008 | Tayebi et al. | |
| 7,523,194 B2 * | 4/2009 | Strohwig et al. | 709/224 |
| 7,827,114 B2 * | 11/2010 | Pinkas et al. | 705/75 |
| 7,958,163 B2 * | 6/2011 | Brentano et al. | 707/805 |
| 8,135,756 B2 * | 3/2012 | Brentano et al. | 707/805 |
| 8,185,478 B2 * | 5/2012 | Pinkas et al. | 705/75 |
| 2001/0025377 A1 | 9/2001 | Hinderks | |
| 2001/0034763 A1 | 10/2001 | Jacobs et al. | |
| 2001/0054042 A1 | 12/2001 | Watkins et al. | |
| 2002/0016910 A1 * | 2/2002 | Wright et al. | 713/150 |
| 2002/0032027 A1 | 3/2002 | Kirani et al. | |
| 2002/0042835 A1 | 4/2002 | Pepin et al. | |
| 2002/0069214 A1 | 6/2002 | Smith et al. | |
| 2002/0072967 A1 | 6/2002 | Jacobs et al. | |
| 2002/0103737 A1 | 8/2002 | Briere | |
| 2002/0138441 A1 | 9/2002 | Lopatic | |
| 2003/0009425 A1 | 1/2003 | Stonedahl et al. | |
| 2003/0023963 A1 | 1/2003 | Birkholz et al. | |
| 2003/0050822 A1 | 3/2003 | Hoffman | |
| 2003/0050832 A1 | 3/2003 | Jacobs et al. | |
| 2003/0050859 A1 | 3/2003 | Rodriguez | |
| 2003/0053475 A1 | 3/2003 | Veeraraghavan et al. | |
| 2003/0060228 A1 | 3/2003 | Capers et al. | |
| 2003/0074249 A1 | 4/2003 | Hoffman et al. | |
| 2003/0084003 A1 * | 5/2003 | Pinkas et al. | 705/71 |
| 2003/0095550 A1 | 5/2003 | Lewis et al. | |
| 2003/0096600 A1 | 5/2003 | Lewis et al. | |
| 2003/0140041 A1 | 7/2003 | Rosensteel, Jr. et al. | |
| 2003/0145018 A1 | 7/2003 | Hitchcock et al. | |
| 2003/0146977 A1 | 8/2003 | Vale et al. | |
| 2003/0149738 A1 | 8/2003 | Jacobs et al. | |
| 2003/0158742 A1 | 8/2003 | Ford et al. | |
| 2003/0167181 A1 | 9/2003 | Lundberg et al. | |
| 2003/0217011 A1 | 11/2003 | Peinado et al. | |
| 2003/0236886 A1 | 12/2003 | Oren et al. | |
| 2004/0249756 A1 | 12/2004 | Garibay et al. | |
| 2005/0033652 A1 | 2/2005 | Brentano et al. | |
| 2005/0033774 A1 * | 2/2005 | Brentano et al. | 707/200 |
| 2005/0086501 A1 | 4/2005 | Woo et al. | |
| 2005/0108173 A1 | 5/2005 | Stefik et al. | |
| 2006/0036732 A1 * | 2/2006 | Strohwig et al. | 709/225 |
| 2006/0080742 A1 | 4/2006 | Nakayama et al. | |
| 2006/0089912 A1 | 4/2006 | Spagna | |
| 2006/0277122 A1 | 12/2006 | Shear et al. | |
| 2007/0220051 A1 * | 9/2007 | Brentano et al. | 707/104.1 |
| 2008/0071686 A1 | 3/2008 | Tayebi et al. | |
| 2008/0107264 A1 | 5/2008 | Van Wie et al. | |
| 2009/0228597 A1 * | 9/2009 | Strohwig et al. | 709/229 |
| 2011/0029780 A1 * | 2/2011 | Pinkas et al. | 713/181 |
| 2011/0264965 A1 * | 10/2011 | Strohwig et al. | 714/48 |
| 2012/0144381 A1 * | 6/2012 | Brentano et al. | 717/170 |

FOREIGN PATENT DOCUMENTS

| | | |
|---|---|---|
| EP | 1126396 | 8/2001 |
| EP | 1126674 | 8/2001 |
| JP | 11-338745 | 12/1999 |

OTHER PUBLICATIONS

"Computer Dictionary", Second Edition, Copyright 1994.

"Intraware screen captures obtained via the WayBackMachine", archive.org, Jun. 4, 2002.

"Netopie Looks to Intraware to Provide Cost Effective Software Update and Delivery Service to Improve IT Efficiencies", business Editors, Business Wire, Apr. 11, 2001.

"Netview File Transfer Program—Parameter Reference", Second Edition, IBM, SH12-6052-01, Dec. 2004, pp. 1-176.

"Screen Captures of Intraware.com", obtained via www.archive.org, Aug. 2, 2002.

"Screen captures of Intraware.com website", obtained via www.archive.org, Sep. 8, 2005.

Aoyama, et al., "A Commerce Broker of Software Components and Its Experience", Dept. of Inf. & Electron. Eng., Nigata Univ., Japan, Nov. 1988.

Asokan, "Fairness in Electronic Commerce", A Thesis Presented to the University of Waterloo in Fulfillment of the Thesis Requirement for the Degree of Doctor of Philosophy in Computer Science, 1998.

Braun, et al., "Protocol Implementation Using Integrated Layer Processing", INRIA, Sophia Antipolos, France, 1995.

Brockners, "Bulk multicast data transfer—towards the integration of FEC and ARQ using a lightweight feedback control tree", Center for Parallel Computing, Univ. of Cologne, Germany, Jul. 1997.

Cooper,, "Managed File Distribution on the Universe Network", Computer Communication Review, vol. 14, No. 2, USA, 1984, pp. 10-17.

Czajkowski, et al., "JRes: A Resource Accounting Interface for Java", Proc. of ACM OOPLSA Conference, Vancouver, BC, Canada, Oct. 1998.

Daka, et al., "A High Performance Broadcast File Transfer Protocol", Computer Communication Review, vol. 18, No. 4, 1988, 274-281.

Danzig, et al., "A Case for Caching File Objects Inside Internetworks", Univ. of Colorado, Boulder, USA, Mar. 1993.

Diot, et al., "Multimedia Applications Should Be Adaptive", INRIA, Sophia Antipolis, France, 1998.

Donahoo, et al., "Multiple-Channel Multicast Scheduling for Scalable Bulk-data Transport", 1998.
Joeris, "Change Management Needs Integrated Process and Configuration Management", Intelligent Systems Dept., Center for Computing Technology, Univ. of Bremen, 1997.
Joeris, "Characterization of Integrated Process and Product Management", Intelligent Systems Dept., Center for computing Technology, Univ. of Bremen, 1997.
Khalidi, et al., "The Spring Virtual Memory System", Sun Microsystems Laboratory, Mountain View, CA USA, Feb. 1993.
Kreuger, "Applications of Partial Inductive Definitions", Conclusions from Some Projects Run at SICS KBS-Lab, 1986-1992.
Padmanabhan, et al., "The Content and Access Dynamics of a Busy Web Site: Findings and Implications", Proc. of ACM SIGCOMM 2000, Stockholm, Sweden, Aug. 2000.
Pesce, "Bell of Pennsylvania Bulk File Transfer Project", Interface '87 Papers Proc., McGraw Hill Inf. Syst., New York, USA, 1987, pp. 40-47.
Pralle, "Driving the Software Release Process with Shape", Technische Universitat Berlin, 1998.
Schill, "Distributed Platforms", Dresden Unvi. of Technology, 1996.
Tham, et al., "Minimizing Transmission costs Through Adaptive Marking in Differentiated Services Networks", Management of Multimedia on the Internet, Springer-Verlag, Berlin, Germany, 2002.
Vicisano, et al., "One to Many Reliable Bulk-Data Transfer in the Mbone", Proc. of the Third Int'l Workshop on High Performance Protocol Architectures HIPPARCH, Uppsala, Sweden, Jun. 1997.
Weissman, "Smart File Objects: A Remote File Access Paradigm", Division of Computer Science, Univ. of Texas, San Antonio, 1999.
Wilder, "Effectiveness of Congestion Avoidance: A Measurement Study", IEEE IFNORCOM '92, 11th Annual Conf. on Computer Communications (Cat. No. 92CH3133-6), vol. 3, New York, USA, 1992, pp. 2378-2390.
Yamasaki, "Special Purpose User-Space Network Protocols", USENIX Association Winter Conference Dallas, 1998, pp. 63-69.

* cited by examiner

METHOD AND SYSTEM FOR MANAGING DIGITAL GOODS

CROSS REFERENCE TO RELATED APPLICATION

This application is a continuation of U.S. patent application Ser. No. 11/608,201 filed Dec. 7, 2006 now U.S. Pat. No. 8,135,756, which is a continuation of U.S. patent application Ser. No. 10/835,688 filed Apr. 29, 2004, now U.S. Pat. No. 7,958,163, which is a continuation-in-part of U.S. patent application Ser. No. 10/635,840 filed Aug. 5, 2003, now abandoned, each of which is incorporated herein in its entirety by this reference thereto.

BACKGROUND OF THE INVENTION

1. Field of the Invention

The invention relates generally to electronic distribution of digital goods. More particularly, the invention relates to movement of digital goods from a vendor to an electronic distribution system.

2. Technical Background

Digital delivery has emerged as an efficient and profitable method of distributing digital goods, such as software. While some vendors of digital goods offer simple downloads from their Web sites, these services provide only limited value to the vendor and the vendor's customers. There is a growing demand from end-users for increased services and from vendors for better management and control of the complete delivery process.

J. Brentano, T. Pieper, P. Martinelli, B. Thompson, Method and system for managing digital goods, U.S. patent application Ser. No. 10/635,840 (Aug. 5, 2003) provide a portal from which a vendor of digital goods distributes its goods to its customer base. Images of the goods to be distributed are associated with metadata that model the often complex relationships among the digital goods. The goods reside on a central repository and are then made available to entitled accounts. While the images from which copies of the goods are made can be provided to the portal by the vendor individually, it would be desirable to automate the process fully, providing a special advantage to vendors of enterprise software, for example, who may have very large numbers of files or files of very large size that must be uploaded in short periods of time. The prior art provides a number of examples of moving data from one machine or application to another.

W. Rodriguez, J. Barnett, S. Marks, System, method and computer program product for a catalog feature in a supply chain management framework, U.S. Patent Application Publication No. 2003/0050859, filed Mar. 23, 2001; and the related application G. Hoffman, A. Menninger, M. Burke, System, method and computer program product for an entertainment media supply chain management framework, U.S. Patent Application Publication No. 2003/0074249, filed Mar. 13, 2001 describe an infrastructure for supply chain management. Supply chain participants send raw supply chain data to a central data warehouse. The data are formatted and republished to the participants as reports; for example, materials cost reports, or sales/cost comparisons. Additionally, participants in the supply chain can order goods from each other.

While Rodriguez, et al. and Burke, et al. provide a platform for participants to share data so that they can plan and forecast collaboratively, they do not consider the problem of efficiently moving digital goods in bulk and reliably associating the digital goods with correct metadata at their destination.

A. Rivlin, Apparatus and method for annotated bulk copying of files to a database, U.S. Pat. No. 6,032,159 (Feb. 29, 2000) describes an apparatus and method for tracking the transfer status of individual files being copied in bulk from one application to another. While transfer status of individual files is monitored, no solution is proposed for reliably associating the transferred files with the correct metadata, or for verifying that the correct file was transferred and was not corrupted in transit.

K. Rosensteel, K. Allen, W. Lawrance, Method and data processing system providing bulk record memory transfers across multiple heterogeneous computer systems, U.S. Pat. No. 6,615,217 (Sep. 2, 2003), describe a means whereby bulk data is written by an application on a first computer to a file on a second heterogeneous computer system. Jobs or tasks are started from one system to execute on the second system with the results being returned to the first system. The system described does not contemplate distribution of digital goods by a vendor to its customer base. Additionally, no solution is proposed for reliably associating the transferred files with the correct metadata, or for verifying that the correct file was transferred and was not corrupted in transit.

J. Daka, A. Waters, A High Performance Broadcast File Transfer Protocol, Computer Communication Review 18, 274-81 (No. 4, 1988) and N. Pesce, Bell of Pennsylvania Bulk File Transfer Project, in Interface '87 Proceedings 40-47 (1987) describe different implementations of bulk data transfer.

None of the systems described above contemplate transfer of digital goods to a central repository by a vendor or distribution of the goods by a vendor to its customer base. Furthermore, no solutions to the challenge of providing an automated method that reliably links file images with the correct product metadata or of verifying that the file image was not damaged or corrupted in transit are offered.

It would therefore be a significant technological advance to automate the process of delivering digital goods to an electronic delivery service, thus providing an easier, more reliable way for a supplier to add goods to the service. More particularly, it would be advantageous to facilitate provision of digital images and reliably linking the images with the corresponding metadata while verifying that the image is correct, and has not been compromised in transit.

SUMMARY OF THE INVENTION

A system and method for moving digital goods facilitates bulk upload of file images to a central repository of, for example, a system for managing digital goods. The system software gets a File ID and a path to each file image to be uploaded from a list of input parameters provided by the vendor of the digital goods. In an exemplary embodiment, the list of input parameters is provided as an XML (eXtensible Markup Language) file, typically containing input attributes for a number of file images. The input attributes for a file image additionally include a checksum or message digest that can be used for verifying data integrity of the file image. If the software successfully verifies the file image, it uploads the file image to the central repository and links it with a corresponding metadata object within a product description.

The product description is, for example, a product hierarchy designed to model the product relationships involved in distribution of digital goods, such as digital images, books, or software products. The product hierarchy is based on associations among an assortment of primary objects, for example: 'entitlements,' products' and 'files.'Each file image's 'file' object contains attributes that describe the file image. When the 'file' object is created, the vendor may specify at least some of the attributes for the file image. Additionally, as the file image is being uploaded, the software determines file image attributes and enters them into the 'file' object.

File images are uploaded from a server, typically an FTP server, where they have been placed by the vendor. Use of the checksum or message digest allows file integrity to be verified. Additionally, the file images can be uploaded directly from a computer operated by the vendor.

BRIEF DESCRIPTION OF THE DRAWINGS

FIG. 5 provides a sketch of a user interface for creating metadata objects according to the invention; and FIG. 6 provides a sketch of a user interface for uploading a transaction file according to the invention.

DETAILED DESCRIPTION

In commonly-owned, co-pending U.S. patent application Ser. No. 10/635,840, which is hereby incorporated by reference as if fully set forth herein, Brentano, et al. describe a hosted, network-based delivery and support solution that enables vendors of digital goods, such as e-books, digitized sound and image files and software products, to easily deliver, track, and manage the digital goods and entitlements that the vendors distribute to their global customers. The digital goods are distributed as copies of file images that reside on a central repository. The present invention provides an automated method for uploading the images in bulk to the repository from the digital goods vendor and associating the images with the correct metadata.

Figure 1:
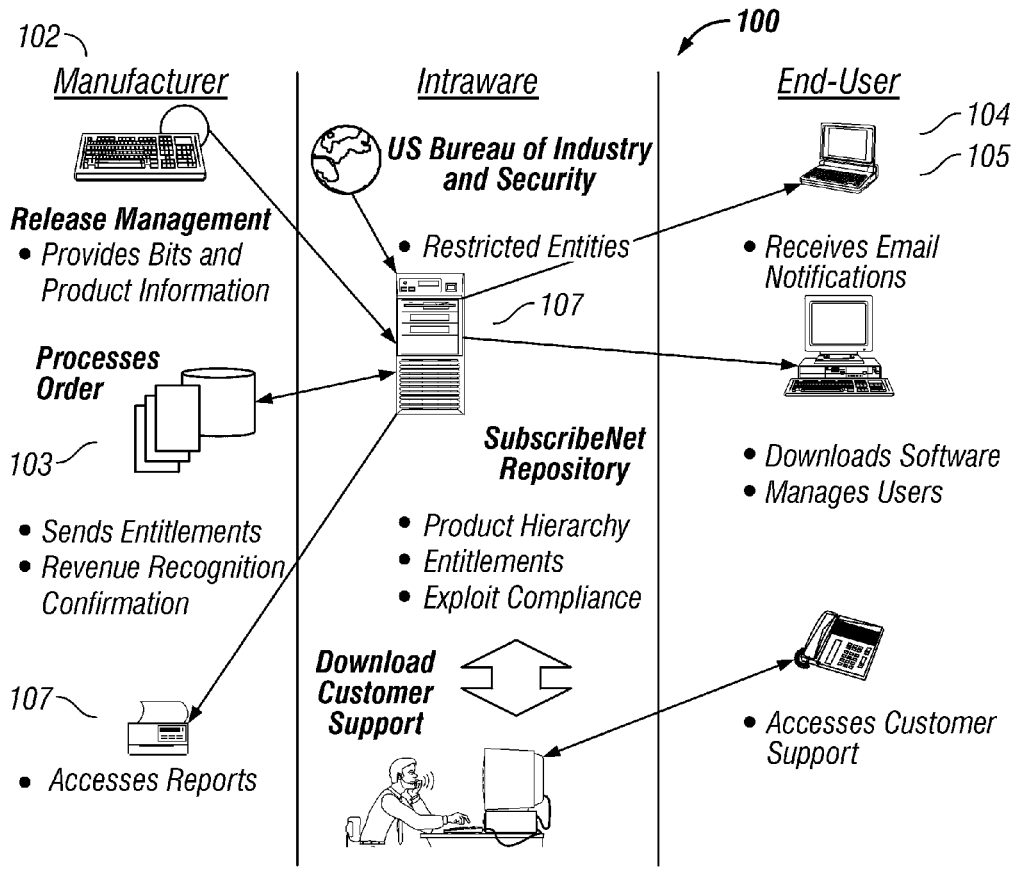
FIG. 1 provides a data flow diagram in a system for managing digital goods according to the invention.

FIG. 1 provides a diagram of a system for managing digital goods 100. The system may be implemented across a publicly accessible network, such as the Internet. Data flow within the invented system is also shown. The invented system is built around a repository 101, the repository including one or more servers and associated mass storage that store a copy of a vendor's product, documentation, release notes and any other related material. These are typically provided by the vendor 102 as part of the original implementation of the product management and distribution service provided through the system. Subsequently, the materials are refreshed as products are updated. The system also associates each downloadable file (image) with one or more vendor part numbers. Typically, the system operator makes the system available to vendors on a subscription, or fee basis; however, other business models are possible Once the images are loaded onto the system, and the part numbers created, the system is ready to process orders 103 and deliver the digital goods, for example, software, to the vendor's customers 104. This 'entitlement' process typically happens with, for example, an XML-based data feed that originates with the vendor's order management or ERP (enterprise resource planning) system.

The data feed specifies which customers are being entitled to which part numbers, and under what license and maintenance terms. The entitlement data feed may also contain other vendor-specific information, such as license keys and support codes. Other methods of transmitting order information to the system may be envisioned by one having an ordinary level of skill and are well within the scope of the invention.

The system processes the data feed and creates user accounts, if necessary, and the entitlements that allow the customer to see and download the appropriate images when they log into the service web site. The system also associates all the vendor and customer specific information with the vendor part numbers so that they are available at the time of delivery.

The system then generates e-mail messages 105 to designated contacts within the customer account to notify them that their software is available. The email may include a unique URL that gives the customer access to his or her own dynamically generated, and password-protected web site, thus providing the customer a personalized, digital goods management portal. The web site may be branded to the vendor, having the same look and feel as the rest of the vendor's web site. Through this personalized web site, the customer gains ready access to any digital goods the customer is entitled to, as well as any related documentation, access keys, release notes, and contact information, not only for the current order, but also for any previous releases to which that customer is entitled.

The system can also be configured so that when the customer first attempts to download a particular product, the customer is required to read and to accept online end-user license agreement (EULA). A reporting function 107 delivers regular reports to the vendor, allowing the vendor to closely monitor activities from all of the vendor's customer accounts.

A purpose of the present invention is to allow a vendor to fully automate the process of delivering products to an electronic delivery service, thereby making it faster, easier and more reliable to add digital goods to the service. The invention addresses the particular problem of providing the actual digital image and of reliably linking the image with the correct product metadata.

As previously mentioned, the electronic delivery service extensively uses XML (exTensible Markup Language) for data interchange. Additionally, user interfaces are created using XML. Practitioners of ordinary skill will recognize that XML is well-suited for the management, display and transport of data. Along with a handful of related technologies, it has become the standard for data and document interchange on the World Wide Web, providing a number of advantages of particular importance to movement of digital goods, as practiced in the invention:

XML allows document type creators to clearly identify the role and syntax of each piece of interchanged data using a definition that is both machine-processable and human-interpretable;

XML allows document type creators to identify the source of each shared structure using an Internet URL (Uniform Resource Locator);

XML allows document type creators to identify which pieces of information should occur in each interchanged set of data and, where relevant, the order in which individual fields should occur in a particular message stream;

XML documents can be given metadata fields that can be used to identify who is responsible for creating, transmitting, receiving and processing each message and can have built-in facilities for identifying the storage points of programs that should be used to control processes; and XML can make use of facilities provided by Hypertext Transfer Protocol (HTTP) that can identify when a message should be moved from one stage of the interchange process to another, and to check that the relevant forms of interchange have taken place.

XML uses Schemas to define the structure of XML documents. The Schema, itself a separate XML document, defines the content model that serves as the template for a specific document type. The fundamental building blocks of an XML document are data elements and attributes. By using these fundamental pieces, it is possible to design a customized vocabulary for particular types of data or for particular applications or situations. As is commonly done in the data processing arts, defining a data element or attribute is known as "declaring" it. In the XML setting, a specific document is viewed as an instance of its Schema. An XML document contains a pointer to its Schema. Using the Schema, a validating parser can verify that the document follows the rules of its vocabulary. One skilled in the art will readily recognize that electronic data interchange between two parties is greatly facilitated if a common vocabulary is used to describe and categorize the data.

XML facilitates electronic data interchange (EDI) by:

Allowing creation of application-specific forms that users can complete to generate EDI messages;

includes software embodying program instructions for performing the various operations described herein. A processing element, at for example, the WWW server 205 executes the program instructions.

A FTP (File Transfer Protocol) server 206 provides the vendor a location to deposit file images for upload to the distributor. FTP is a commonly known protocol for transfer of data objects and the configuration of an FTP server for this purpose is well within the capability of one having an ordinary level of skill in the art. FTP provides the capability of transferring large numbers of files with a single command-line instruction, for example 'mput'. Additionally, FTP allows the transfer of large numbers of individual files as uncompressed or compressed archives, for example, .TAR, .TAZ and .ZIP files. Additionally, the vendor can upload single files or small files by means of a user interface on WWW server 205.

As described above, transactions such as entitlements are delivered to the distributor from the vendor via XML data feed 207. Additionally, transactions are delivered by means of a transaction file uploaded to the server. Of particular importance to the present invention is a 'load file' transaction. Table 1, below, shows an exemplary XML transaction file containing exemplary code for a 'load file' transaction. One skilled in the art will recognize that the particular selection of attributes and attribute names below is for descriptive purposes only, and is not intended to limit the invention.

TABLE 1

```
<?xml version="1.0" ?>
<SnetTransactionsFile
xmlns="http://www.intraware.com/schemas/2002/12/SnetTransactionsFile"
xmlns:xsi="http://www.w3.org/2001/XMLSchema-instance"
xsi:schemaLocation="http://www.intraware.com/schemas/2002/12/SnetTransact
ionsFile
O:\p4\picasso\java\mocha_grande\properties\SnetTransactionsFile.xsd">
<LoadFileImage>
<File>
    <FileID>test-file</FileID>
</File>
    <RetrieveFromLocation>TESTFILE.ZIP</RetrieveFromLocation>
<ExpectedCheckSum>593f3a8a92422b1f806e703cdef2b420</ExpectedCheckSu
m>
    </LoadFileImage>
    </SnetTransactionsFile>
``` generating EDI message formats for transmission between computers over networks, such as the Internet; and allowing data received in EDI format to be interpreted according to sets of predefined rules for display by the receiver on standardized browsers using a user-defined template, rather than having to rely on specially customized display packages.

Figure 2:
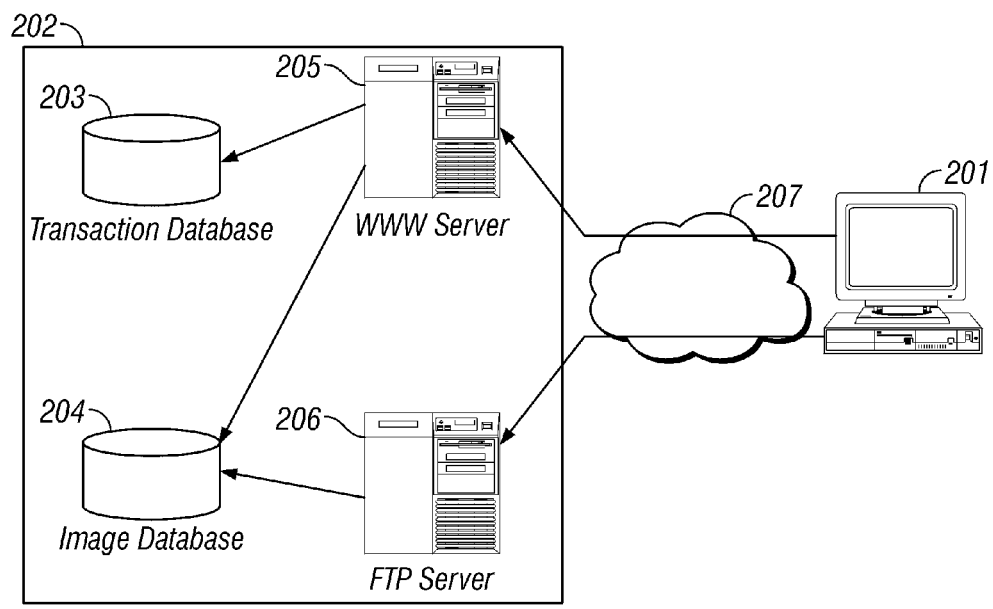
FIG. 2 shows data flow between a digital goods vendor and a distributor during movement of digital goods from vendor to distributor.

Referring now to FIG. 2, a more detailed view of the electronic distributor 202 is shown. As previously described, the repository 101 includes one or more servers. In the embodiment of FIG. 2, the repository includes a transaction database 203 and an image database 204. The image database 204 houses the image files from which the copies are made to distribute to the vendor's customer base. Additionally, documentation, release notes and any other related material are stored in the image database 204. The transaction database 203 stores the hierarchic product description, composed of metadata objects, and other business objects that are associated with each other in a manner that models the relationships among the various products, releases and versions produced by the vendor. Additionally, the electronic distribution system As shown, the 'load file' transaction provides the system software with the necessary information to locate a particular file image on the FTP server, upload it to the image database, and associate it with the proper metadata object. The attribute "FileID" specifies a File ID. The File ID may be a manufacturer supplied part number or other descriptor, or it may be an ID internally assigned by the distributor. Other means of identifying the specific object to be uploaded will be apparent to those skilled in the art.

'RetrieveFromLocation' gives the pathname that identifies the actual location of the file image. In the case of a FTP server, each vendor has its own password-protected directory space on the FTP server. Thus, one skilled in the art will recognize that a relative pathname will suffice for locating the file image. While upload from the FTP server is the preferred embodiment of the invention, another embodiment is possible wherein the file image is uploaded from the vendor operated computer. In this case, the value of 'RetrieveFromLocation' must be a fully qualified pathname.

'ExpectedChecksum' gives a value that can be used to verify both the identity of the file image and its data integrity, allowing ready identification of file images that have been damaged in transit. A variety of detection schemes, described below, is possible.

Checksum—A simple error-detection scheme in which each transmitted message is accompanied by a numerical value based on the number of set bits in the message.

The receiving station then applies the same formula to the message and checks to make sure the accompanying numerical value is the same. If not, the receiver can assume that the message has been garbled.

Message Digest—A computation used to secure and verify data. The sender of a message computes a message digest by performing a one-way hash function using a secret key known only to sender and recipient. The recipient performs the same one-way hash function using the secret key, which creates a new message digest. The two message digests are compared, and if they are identical, the recipient knows the data has been transmitted without modification.

MD5 Checksum (Message Digest number 5)—a 128-bit value similar to a checksum. Its additional length (conventional checksums are usually either 16 or 32 bits) means that the possibility of a different or corrupted file having the same MD5 value as the file of interest is drastically reduced. Because every different file has an effectively unique MD5 value, these values can also be used to track different versions of a file. Those skilled in the art will recognize that the MD5 value is computed according to the MD5 message digest algorithm. While the MD5 value is commonly referred to as an "MD5 checksum," it is actually a message digest. The MD5 checksum is the preferred error-detection scheme for the purposes of the invention due to its reliability.

As above, the structure of an XML file such as the transaction file of the invention is defined by a separate XML document, the Schema, and the transaction file itself is an instance of the Schema. The attribute 'xsi:schemaLocation' gives a network address where the Schema is to be found. When the system software processes the data contained in the transaction file, it refers to the Schema at the location given to validate the data.

The exemplary transaction file of Table 1 contains a single transaction. While it is possible to process a transaction file containing a single transaction, in actual practice a single transaction file contains many 'load file' transactions. Uploading of single file images or small numbers of file images is dealt with below.

Figure 6:
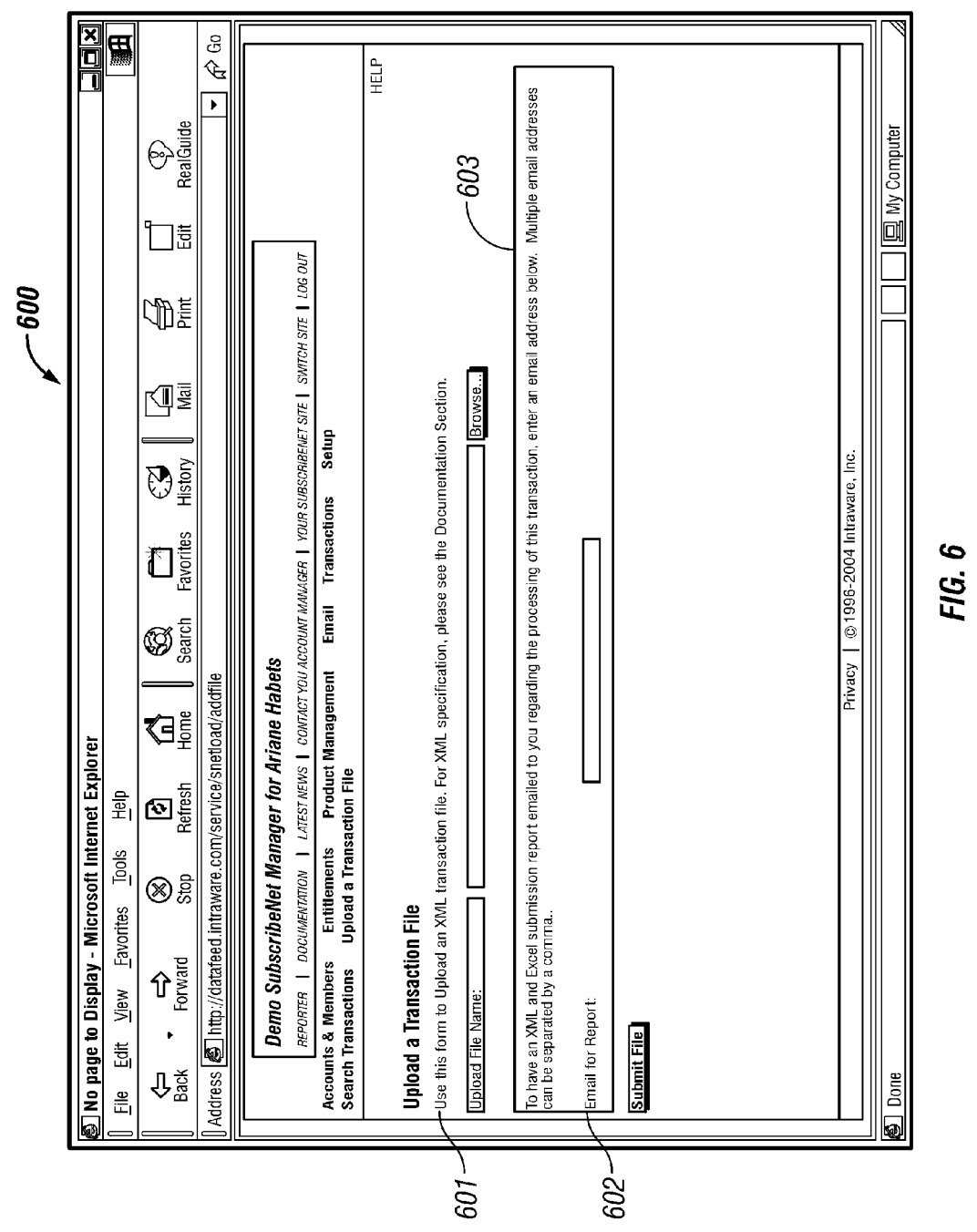

FIG. 6 shows a user interface 600 for uploading a transaction file. A text box 601 allows the operator, typically the vendor, to provide the pathname and the file name of the transaction file to be uploaded. The information can be manually keyed-in, or a 'browse' button allows the operator to point to the transaction file on the vendor-operated computer 201. A second text box allows the operator to enter an email address to which submission reports can be mailed. As shown, the submission reports are provided both in XML and spreadsheet format. After providing the required submission information, the operator activates a 'submit' button 602, whereupon the system software uploads the transaction file to the server 205. Following upload, the system software save the transactions to the transaction database 203.

Figure 3:
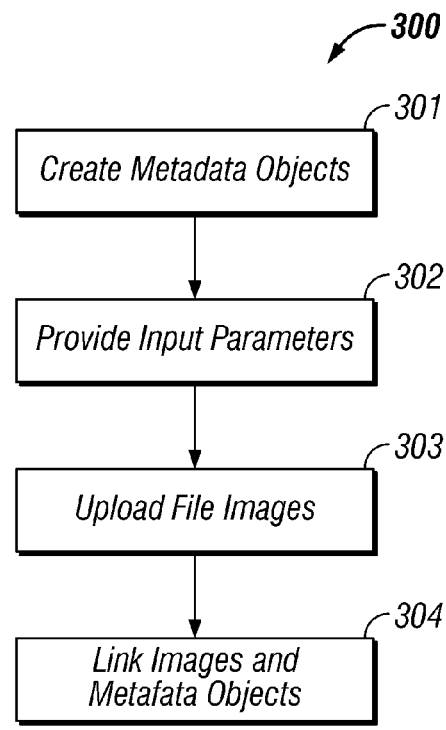
FIG. 3 provides an overview of a method for moving digital goods according to the invention.

Table 2 provides a pseudo code listing for a method of bulk transfer of digital goods 300 according to the invention. FIG. 3 provides a corresponding block diagram of the invented method.

TABLE 2

File Upload
========================
Input parameters
    Intraware File ID - mandatory
    File Name (and optional Location) - mandatory
    partnercode - mandatory
    MD5 checksum value - optional
Get the ftpMountDirectory where the files are located from the property file
    If not defined, error
Get the partnercodeDirectory to add to the ftpMountDirectory to limit for the current partner from the property file
    If not defined, error
ftpDirectory = ftpMountDirectory/partnercodeDirectory
Get the File Business Object (BO) that contains the File Metadata based on the Intraware File ID and the partnercode input parameters
    If not found, error
If the current/old extension is zip or jar
    remove the file details
Get the FileName and Location from the input parameters and get the file from the ftpDirectory
    If the file does not exist, error
    If the directory or file is not readable by the application, error
Do an MD5 checksum on the file
If an MD5-checksum value was passed in, check that the value is the same (This is an extra check to make sure the file was uploaded to Intraware's Systems without any problems)
If the values are not identical, error
If the new extension is "zip" or "jar"
    try to gather the zip entries
    in case of an error
        see if this partner wants to fail for this error (property file)
        if not fail
            ignore and discard the zip entries information
        else
            error and report the zip problem
Load the image into the iw_esd database
    insert or update the iw_esd:download_image
    insert into iw_esd:updated_image table which drives the replication
set update/insert timestamps in iw_main:download_image
Update the File BO with
    compressed file size from actual file
    actual MD5 checksum for actual file
    filename (and location) from inputparameters
    set statuscode to LOADED
    set lastRetrievedFromLocation
    update datetime stamps Preferably, the vendor creates the metadata object corresponding to the file image before the file image is uploaded. A preferred embodiment of the invention uses a transaction file or a data feed as described above in relation to 'entitlements' and 'load file' transactions to automate the process of creating metadata objects. An alternate embodiment of the invention allows the vendor to create metadata objects interactively.

Figure 5:
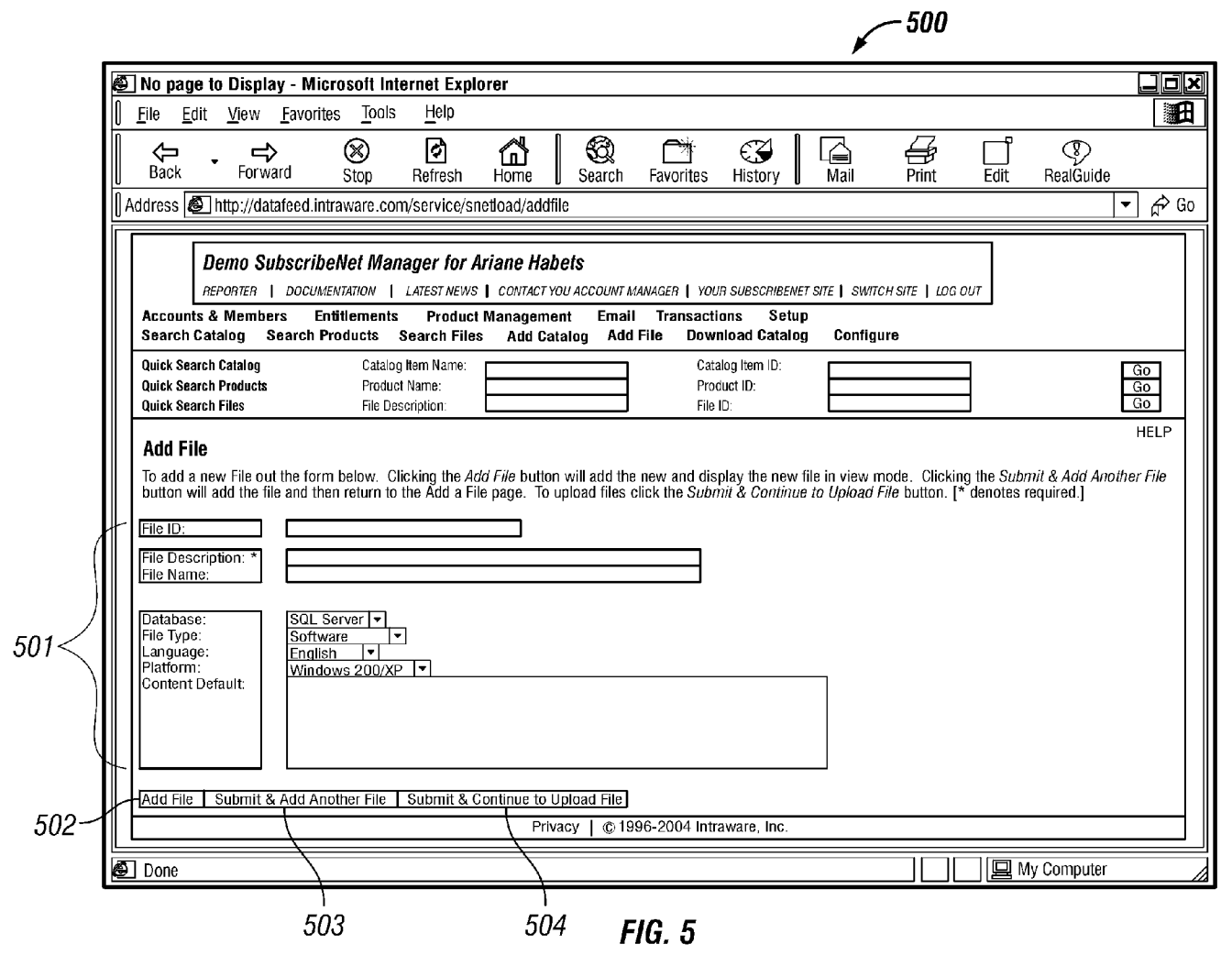

FIG. 5 shows a user interface 500 for creating metadata objects. Included is a plurality of blank fields 501 wherein the vendor provides values for the corresponding file image. Preferably, a unique File ID provided by the vendor serves as the main file descriptor. However, other attributes, for example a system File ID, as long as the value is unique to the particular file image, are also suitable for use as the unique file descriptor. Additional file image attributes may include:
    file description;
    file name;
    database;
    file type;
    language;
    platform; and
    content detail.

The above list is descriptive only and is not intended to be limiting. Other file image attributes consistent with the spirit and scope of the invention will be apparent to the skilled practitioner. After specifying values for at least some of the attributes, the operator activates one of buttons 502, 503 and 504 to submit the metadata object. Button 502 allows the operator to create and submit a single metadata object. Button 503 allows the operator to create a metadata object and proceed immediately to creation of another. For cases when a bulk file upload would be impractical, for example uploading one or a few file images, activating button 504 allows the operator to create and submit a metadata object and to proceed immediately with uploading the corresponding file image.

Preferably, the vendor next provides input parameters 302 for the file image or file images to be uploaded. As described above, the 'load file' transaction provides the necessary input parameters. In the preferred embodiment, the input parameters include at least a File ID and a pathname. Optionally, an error-detection value, such as an MD5 checksum is included.

After input parameters are provided, the file images are uploaded 303 to the image database 204. File images are retrieved from the location specified by the pathname. After the file images are uploaded to the file image database, the system software links the each file image with the appropriate metadata object.

Figure 4:
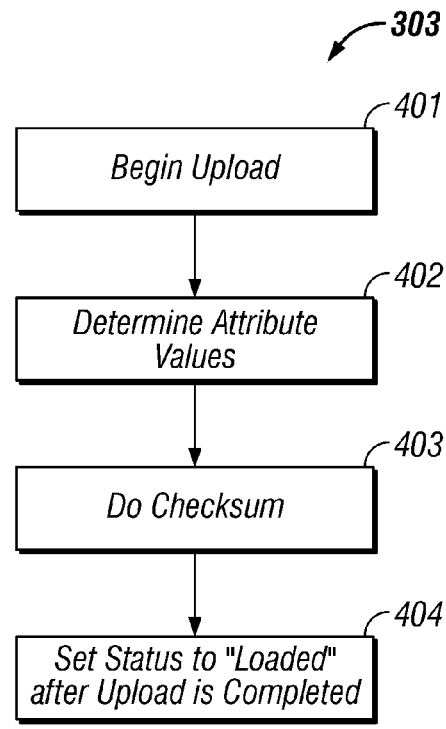
FIG. 4 provides a block diagram of a process for uploading digital goods to a central repository according to the invention.

FIG. 4 provides a block diagram of the sub-steps involved in the step of uploading file images 303. The software begins the file upload from the location specified by the pathname 401. During the upload process, the software determines the values 402 of additional file image attributes to those that were defined when the metadata object was created. For example, during this step the software may determine the file size. Next, if required, the software determines the error-detection value 403 for the file image and compares it to the one previously provided. If the comparison is successful, the software sets the 'loaded' attribute in the metadata object 404.

Several error conditions are possible. The transaction will fail if:
- the metadata object is not found;
- the file image can't be located; or
- an MD5 checksum has been given but does not match the actual MD5 checksum from the file image on the FTP server.

After upload, the original file images may be left on the FTP server indefinitely, or a process may be provided that removes file images that have not been accessed for a configurable period of time, for example ten days.

While the invention has been described in the context of a service for electronic distribution of digital goods, it should be appreciated that the invention finds application in any situation requiring the exchange of one or both of large numbers of data files or large data files, wherein the files must be associated with metadata. Furthermore, while the invention has been described in the context of a publicly-accessible data network such as the Internet, it is equally applicable in any environment involving transfer of large numbers of files to a destination and associating the files with metadata. While the preferred embodiments of the invention rely on XML to facilitate the process of data interchange, other approaches are possible, such as HTML (Hypertext Transfer Markup Language) or SGML (Standard Generalized Markup Language) or LDIF (LDAP Data Interchange Format).

Although the invention has been described herein with reference to certain preferred embodiments, one skilled in the art will readily appreciate that other applications may be substituted for those set forth herein without departing from the spirit and scope of the present invention. Accordingly, the invention should only be limited by the Claims included below.

The invention claimed is:

1. A computer-implemented method of transferring digital goods from one or more vendors to a central network repository, comprising steps of:
   assigning each vendor from among said one or more vendors a unique e-commerce server space directory, wherein the unique e-commerce server space directory includes a unique URL that allows vendors access to their own dynamically generated and password-protected web site;
   loading one or more versions of a plurality of software files from a source location by a vendor;
   obtaining at least one File ID parameter for each version of each software file among the plurality of software files and a source file pathname identifying the actual e-commerce server space directory location of each version of each software file in said plurality of software files at one or more computers operated by said one or more vendors, wherein said at least one File ID parameter is selected from a list of input parameters, wherein said at least one File ID parameter comprises a version file, wherein said version file contains an element corresponding to each version of each software file in said plurality of software files, and wherein said element contains said at least one File ID parameter;
   for each software file in said plurality of software files, verifying the integrity of each version of each software file in said plurality of software files via an error-detection scheme;
   linking each version of each software file in said plurality of software files with a corresponding metadata object within a product description;
   creating said at least one corresponding metadata object by the vendor of each version of each software file in said plurality of software files;
   uploading each version of each software file in said plurality of software files from said source location to said unique e-commerce server space directory, wherein said uploading fails when:
   said at least one file image is not found;
   said metadata object is not found; or
   said software file in said plurality of software files fails an integrity check; and
   interpreting the at least one File ID parameter and the source file pathname according to predefined rules for display of the at least one file image on standardized browsers using a user-defined template.

2. A non-transitory computer-readable storage medium encoded with a computer program for transferring digital goods from one or more vendors to a central network repository, comprising computer-readable code means, said computer-readable code means comprising program code for executing a method for transferring digital goods, said method comprising steps of:
   assigning each vendor from among said one or more vendors a unique e-commerce server space directory, wherein the unique e-commerce server space directory includes a unique URL that allows vendors access to their own dynamically generated and password-protected web site;
   loading one or more versions of a plurality of software files from a source location by a vendor;
   obtaining at least one File ID parameter for each version of each software file among the plurality of software files and a source file pathname identifying the actual e-commerce server space directory location of each version of each software file in said plurality of software files at one or more computers operated by said one or more vendors, wherein said at least one File ID parameter is selected from a list of input parameters, wherein said at least one File ID parameter comprises a version file, wherein said verson file contains an element corresponding to each version of each software file in said plurality of software files, and wherein said element contains said at least one File ID parameter;

for each software file in said plurality of software files, verifying the integrity of each version of each software file in said plurality of software files via an error-detection scheme;

linking each version of each software file in said plurality of software files with a corresponding metadata object within a product description;

creating said at least one corresponding metadata object by the vendor of each version of each software file in said plurality of software files;

uploading each version of each software file in said plurality of software files from said source location to said unique e-commerce server space directory, wherein said uploading fails when:

said at least one file image is not found;

said metadata object is not found; or said software file in said plurality of software files fails an integrity check; and interpreting the at least one File ID parameter and the source file pathname according to predefined rules for the display of the at least one file image on standardized browsers using a user-defined template.

3. A system for transferring digital goods from one or more vendors to a central network repository, comprising:

a source location comprising a server, wherein one or more versions of a plurality of software files is stored at said source location;

memory;

processor means for executing instructions in memory, said instructions including instructions for:

assigning each vendor from among said one or more vendors a unique e-commerce server space directory, wherein the unique e-commerce server space directory includes a unique URL that allows vendors access to their own dynamically generated and password-protected web site;

loading one or more versions of a plurality of software files from a source location by a vendor;

obtaining at least one File ID parameter for each version of each software file among the plurality of software files and a source file pathname identifying the actual e-commerce server space directory location of each version of each software file in said plurality of software files at one or more computers operated by said one or more vendors, wherein said at least one File ID parameter is selected from a list of input parameters, wherein said at least one File ID parameter comprises a version file, wherein said version file contains an element corresponding to each version of each software file in said plurality of software files, and wherein said element contains said at least one File ID parameter;

for each software file in said plurality of software files, verifying the integrity of each version of each software file in said plurality of software files via an error-detection scheme;

linking each version of each software file in said plurality of software files with a corresponding metadata object within a product description;

creating said at least one corresponding metadata object by the vendor of each version of each software file in said plurality of software files;

uploading each version of each software file in said plurality of software files from said source location to said unique e-commerce server space directory, wherein said uploading fails when:

said at least one file image is not found;

said metadata object is not found; or said software file in said plurality of software files fails an integrity check; and interpreting the at least one File ID parameter and the source file pathname according to predefined rules for the display of the at least one file image on standardized browsers using a user-defined template.

* * * * *